United States Patent Office 2,717,270
Patented Sept. 6, 1955

2,717,270

BASIC POLYGLYCOL ETHERS

Jakob Bindler, Riehen, near Basel, Switzerland, assignor to J. R. Geigy A. G., Basel, Switzerland, a Swiss firm No Drawing. Application September 3, 1953,
Serial No. 378,412

Claims priority, application Switzerland June 23, 1950

2 Claims. (Cl. 260—584)

The present application is a continuation-in-part of our copending application Ser. No. 229,883, filed on June 4, 1951 (now abandoned).

The present process concerns the production of basic polyglycol ethers which have proved to be valuable as textile auxiliary products, for instance as very good wetting agents and also as valuable levelling agents in dyeing. In particular it is concerned with the introduction of definite amino groups by methods known per se into higher molecular polyglycol ethers which are active in lowering surface tension, so giving valuable new properties to these compounds.

It is known that the polyglycol ethers with 10 and more ether oxygen atoms from fatty alcohols with 10 and more carbon atoms, from alkanol amides of higher fatty acids and from alkyl substituted phenols and naphthols possess valuable capillary active properties. They have become of great practical importance as non-ionogenic wetting and emulsifying agents and some have already been used as levelling agents in wool dyeing with the complex chromium compounds of metallisable azo dyestuffs. All the above compounds have a terminal hydroxyl group and can be converted, therefore, by methods known per se into the acid sulphuric acid half esters, for instance by treatment with chlorosulphonic acid in inert organic solvents such as ether, chloroform or trichlorethylene, or by treatment with sulfaminic acid, which reactions being known per se may also be termed sulfating.

It has now been found that sulfated polyglycol ethers of the general formula:

$C_{18}H_{37}$—O—($CH_2$—$CH_2$—O)$_n$—
$$\phantom{C_{18}H_{37}\text{—O—}(CH_2\text{—}CH_2\text{—O})_n\text{—}}CH_2\text{—}CH_2\text{—O—SO}_3H$$

wherein $n$ represents a whole number from 14–24, with secondary amines can be converted in an alkaline medium into basic polyglycol ethers of the general formula:

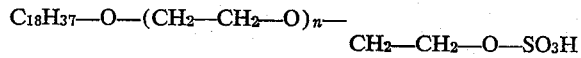

by replacing the sulphated hydroxyl group by the secondary amino group. In this formula $R_1$ and $R_2$ represent methyl or ethyl groups.

Aliphatic amines may be used as secondary amines according to this invention, e. g. dimethylamine, diethylamine. The reaction must be alkaline and is most advantageously obtained in an aqueous medium in a closed vessel at temperatures of over 100° C. For example, a complete reaction is obtained in a few hours at temperatures from 140–180° C. The reaction products can be isolated from the reaction mass by extraction with organic solvents, for instance with benzene, toluene etc. On removal of the solvent they are in the form of oils or wax-like substances which easily dissolve in water. Due to their strong basic tertiary amino group, with acids they form easily water soluble salts. Among other uses, they can preferably be used as levelling agents in acid dyebaths; for this purpose, the dimethylamino compounds are especially suitable.

Much more level, solid and full dyeings are obtained with for example, 0.5–1.5% of these agents, calculated on the weight of the goods to be dyed, with the usual or only slightly increased amounts of acid, e. g. from 2–4%, when using bad levelling wool dyestuffs.

The following examples illustrate the invention without limiting it in any way. Where not otherwise stated, parts are given as parts by weight and the temperatures are in degrees centigrade.

*Example 1*

207 parts of the condensation product obtained by known methods from technical stearyl alcohol (consisting chiefly of octodecyl alcohol) and 20 mol of ethylene oxide are dissolved in chloroform, and a mixture of 32 parts of chlorosulphonic acid and 50 parts of chloroform is added dropwise at a low temperature, after which the mixture is stirred at room temperature for 4 hours. The reaction product is then stirred into 700 parts of an aqueous 10% sodium carbonate solution at a temperature of not over 10°. The aqueous solution of the sodium salt of stearyleikosiglycol ether-sulphuric acid ester of the formula $C_{18}H_{37}$—O—($CH_2$—$CH_2$—O)$_{19}$—
$$\phantom{C_{18}H_{37}\text{—O—}(CH_2\text{—}CH_2\text{—O})_{19}\text{—}}CH_2\text{—}CH_2\text{—O—SO}_3H$$

which has an alkaline reaction to brilliant paper, is drawn off and the sodium salt of the acid sulphuric acid half ester is obtained by drying in the vacuum.

300 parts of this sodium salt are stirred with 344 parts of a 40% aqueous dimethylamine solution and heated in the autoclave at 20 atmospheres excessive pressure for about 8 hours to 150–160°. On cooling, the reaction mass is shaken out with benzene, the benzene solution of the basic polyglycol ether is separated from the water, dried with caustic soda and finally the benzene is distilled off. The basic polyglycol ether so obtained is a light coloured pasty mass which completely dissolves in water. The product consists chiefly of:

$C_{18}H_{37}$—O—($CH_2$—$CH_2$—O)$_{19}$—
$$\phantom{C_{18}H_{37}\text{—O—}(CH_2\text{—}CH_2\text{—O})_{19}\text{—}}CH_2\text{—}CH_2\text{—}N(CH_3)_2$$

A very similar product is obtained if an equivalent amount of diethylamine instead of dimethylamine is used in the above process, or if a polyglycol ether from pure octodecyl alcohol or 15 or 25 mols of ethylene oxide are used as starting products.

*Example 2*

10 parts of wool flannel are entered at 60° C. into a dyebath containing 400 parts of water, 5% Glaubers' salts and 1% of the sodium salt of the azo dyestuff 2-amino-4-chlorodiphenylether→1-(4' - methylbenzene sulphonic acid amide) - 8 - hydroxynaphthalene - 3.6 - disulphonic acid and 1% of the basic polyglycol ether obtained according to example 1. The bath is brought to the boil within 15 minutes, 2% of sulfuric acid is added 30 minutes after the goods are entered and then the bath is boiled for a further 15 minutes. Very even and solid bluish-red dyeings are obtained.

What I claim is:

1. Basic polyglycol ethers having the general formula:

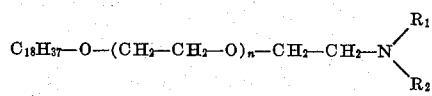

wherein $n$ represents an integer from 14–24, and $R_1$ and $R_2$ represent lower alkyl radicals selected from the group consisting of methyl and ethyl radicals.

2. A basic polyglycol ether having the formula:

$$C_{18}H_{37}-O-(CH_2-CH_2-O)_{19}-CH_2-CH_2-N\begin{matrix}CH_3\\CH_3\end{matrix}$$

References Cited in the file of this patent

UNITED STATES PATENTS

| | | |
|---|---|---|
| 1,970,578 | Schoeller | Aug. 21, 1934 |
| 2,302,388 | Hester | Nov. 17, 1942 |
| 2,355,337 | Spence | Aug. 8, 1944 |